No. 795,814. PATENTED AUG. 1, 1905.
J. J. BUCKLEY, T. P. McGINN & J. A. ROGAN.
SPINNING MACHINE.
APPLICATION FILED FEB. 18, 1905.

3 SHEETS—SHEET 1.

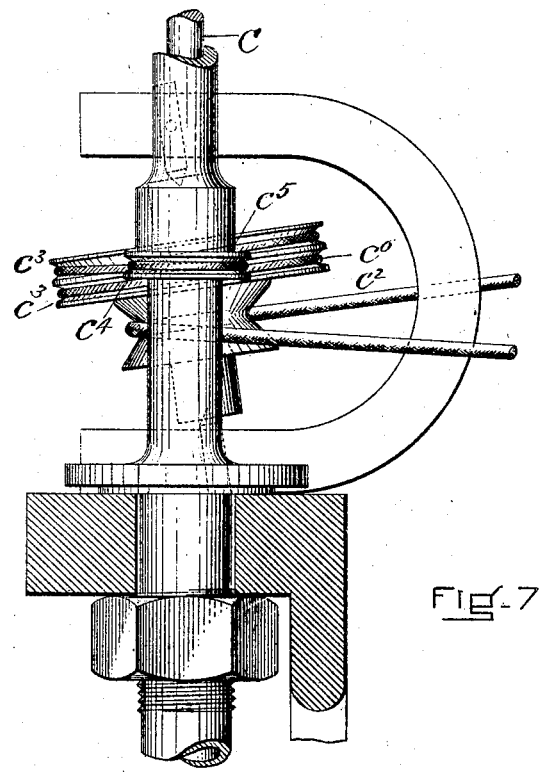
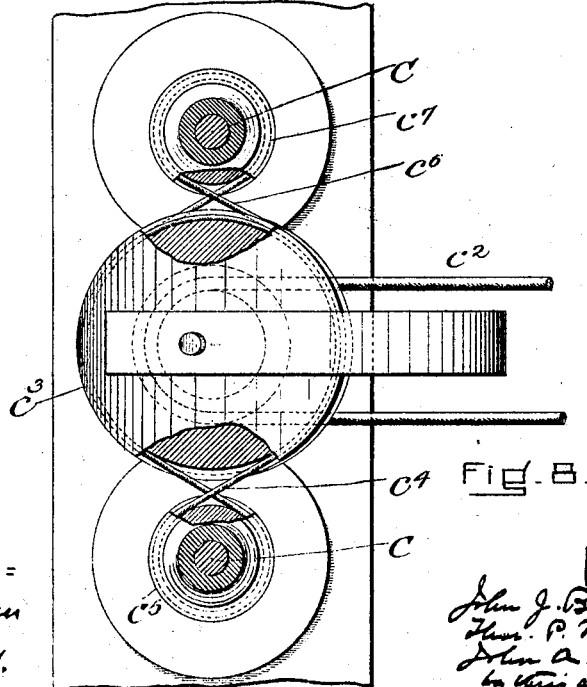

No. 795,814. PATENTED AUG. 1, 1905.
J. J. BUCKLEY, T. P. McGINN & J. A. ROGAN.
SPINNING MACHINE.
APPLICATION FILED FEB. 18, 1905.
3 SHEETS—SHEET 3.
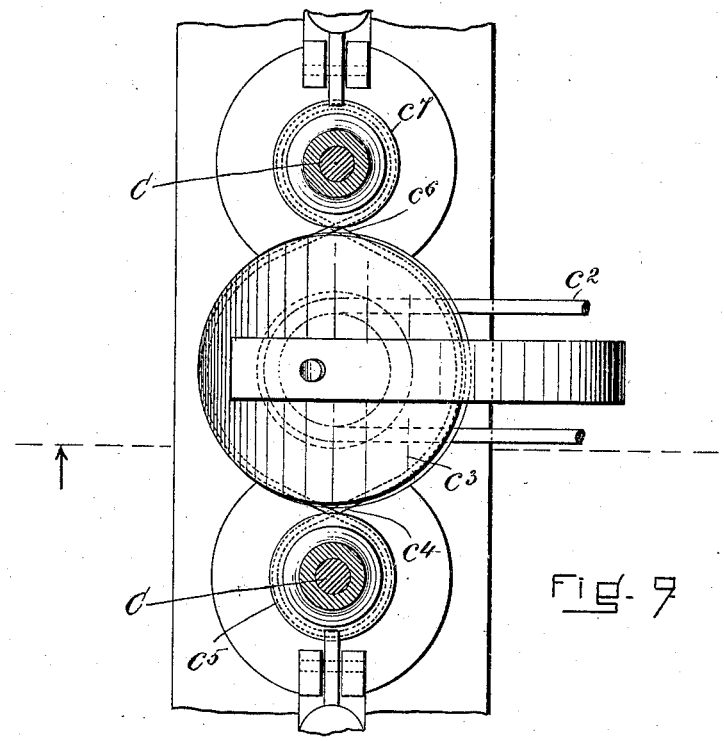
Fig. 7.
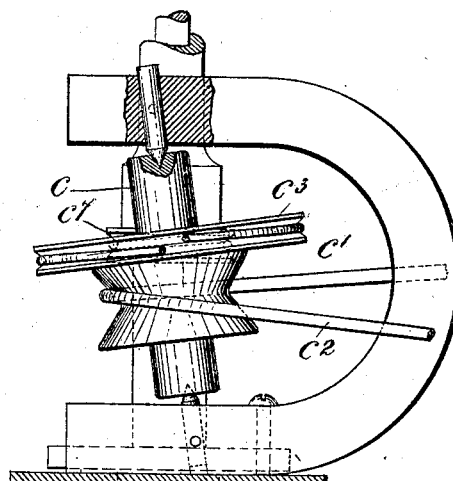
Fig. 10.
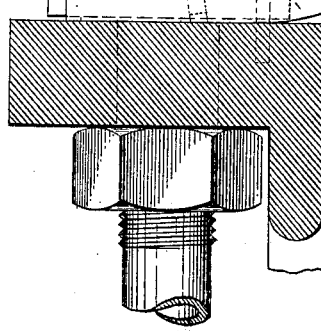

UNITED STATES PATENT OFFICE.

JOHN J. BUCKLEY, THOMAS P. McGINN, AND JOHN A. ROGAN, OF PLYMOUTH, MASSACHUSETTS.

SPINNING-MACHINE.

No. 795,814.     Specification of Letters Patent.     Patented Aug. 1, 1905.

Application filed February 18, 1905. Serial No. 246,320.

*To all whom it may concern:*

Be it known that we, JOHN J. BUCKLEY, THOMAS P. McGINN, and JOHN A. ROGAN, citizens of the United States, and residents of Plymouth, in the county of Plymouth and State of Massachusetts, have invented a new and useful Improvement in Spinning-Machines, of which the following is a full, clear, and exact description, reference being had to the accompanying drawings, forming a part of this specification, in explaining its nature.

The invention relates to means for mounting the ring upon the ring-rail.

The invention is an improvement upon that described in our application for Letters Patent of the United States, filed January 26, 1905, Serial No. 242,717.

We will now describe the invention in conjunction with the drawings, forming a part of this specification, where—

Figure 1:
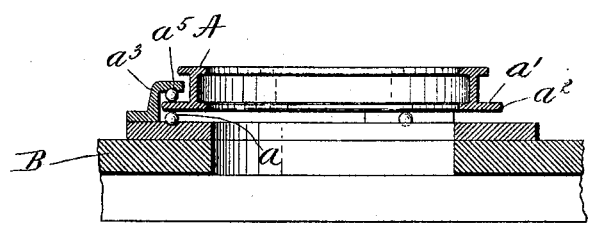
Figure 2:
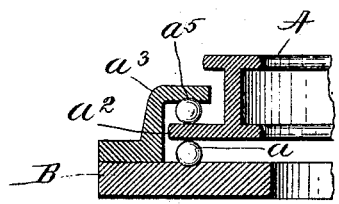

Figure 1 is a view in vertical section of enough of a ring-rail and spinning-ring to show our invention. Fig. 2 is a view in detail thereof, enlarged. Figs. 3, 4, 5, and 6 illustrate modified forms of the invention, to which reference is hereinafter made. Figs. 7 and 8 illustrate by enlarged views means for driving the spindles in pairs, and Figs. 9 and 10 by similar views a modification thereof.

Referring to the drawings, A is the ring, and B is the ring-rail. In our said application the ring is described as mounted upon the stationary roller-points $a$ and is held upon the roller-points and also from lateral movement by means of lips, one surface of which extends over the outer flange $a'$ of the ring and another surface of which is against the adjacent circumference $a^2$ of said flange.

Our present invention provides for the employment of ball-points above the ring as well as below it, so that it may be said that the ring is mounted upon the ring-rail between two sets of ball-points, one set of which acts to bear the ring and the other set of which acts to bear upon it, and these opposed ball-points may be in line with each other or not, as desired. They may also be so combined with the ring as to limit its lateral movement, and thus provide an improved antifriction-thrust-receiving means in which all surfaces move.

Figure 3:
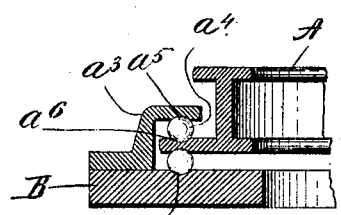

To carry the invention into effect, the flange $a'$ of the ring may be somewhat widened, and the lips $a^3$ may be somewhat lengthened and raised with respect to the upper surface of the ring-flange $a'$ to provide room for the insertion of the superposed ball-points $a^4$, preferably one under each lip. Each lip has in its under surface a cavity $a^5$ for receiving and holding a portion of the ball. If desired, the upper balls may be held, as represented in Fig. 3, between the angular surfaces of the lip and the angular surfaces of the ring formed by the flange and the wall thereof. The lip in such case will have a cavity for holding a portion of the ball, and the ball will project beyond the outer edge of the lip, so that it acts not only to relieve friction between the flange and the lip, but also to receive and relieve the slight lateral movement of the ring. When such construction is followed, the lower ball-points may be below the center of the ring-web and the upper ball-points at one side thereof, or the construction in Fig. 1 may be followed, where both sets of ball-points are in line with each other, the flange of the ring being between them.

In Fig. 2 we have shown the balls in the same relation to the lip and to the rail as represented in Fig. 1, and we have shown the flange $a'$ of the ring as provided with continuous annular grooves $a^6$ $a^7$ in its upper and lower surfaces, forming tracks for the ball-points, the balls extending into said grooves. With this construction the ball-points not only serve to relieve friction, but they also serve to prevent undue lateral movement of the wheel while it is being revolved.

Figure 4:
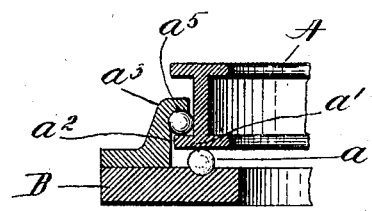

In Fig. 4 the upper ball-point is represented as held in the angle between the lower outer flange and the web of the ring and so that it bears vertically against the flange and horizontally against the web.

Figure 5:
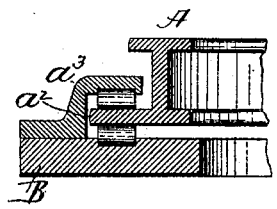
Figure 6:
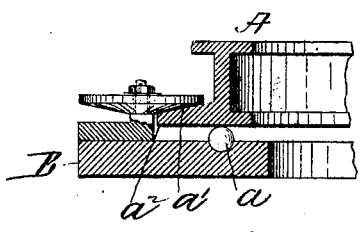

In Fig. 5 we have shown a slight modification, stationary rolls being used for the upper and lower bearings instead of stationary balls, and in Fig. 6 an upper rotatable bearing is shown which is stationarily mounted to revolve horizontally and the lower surface of which may be slightly beveled from its outer edge inwardly, and when such face is used it is desirable that the flange of the ring be beveled or inclined on its upper surface to correspond. A bearing thus formed will restrict lateral movement of the ring and by moving it in or out with regard to the ring, will vary the friction upon or weight of the ring while it is running.

The ring-rail B may have any suitable support for holding the lower ball-points $a$.

In Figs. 7 and 8 we have shown means for rotating the spindles C. The means are adapted to rotate the spindles in pairs, and we have represented a single pair only. The spindles are mounted in the usual way, and interposed between them, carried by a suitable support such as is described in said application, is a shaft or axle $c$. This shaft is preferably in line with the spindles and it has a whirl $c'$, about which the driving-belt $c^2$ from the driving-drum extends and the pulleys $c^3$. One of these pulleys $c^3$ is connected by the belt $c^4$ with the whirl $c^5$, of one of the pair of spindles C, and the other pulley $c^3$ is connected by the belt $c^6$ with the whirl $c^7$ of the other of the two spindles C. Each of the belts $c^4$ $c^6$ is crossed and so that it embraces a large extent of the whirls and a large extent of the pulleys as well, thereby preventing much of any slip of the belt at a high speed.

In order that the sections of the belt where they cross may not wear upon each other, we have caused the axle or shaft $c$ to be slightly inclined or tipped, thereby canting or tipping the pulleys $c^3$ to a horizontal plane, and so that the sections of the belts where they cross are held at slightly-different levels. By this means we are enabled to increase the rate of rotation of the spindles without increasing the rate of rotation of the drum and without much, if any, loss from the slipping of the belt.

Instead of employing two belts, one for each spindle, as shown in Figs. 7 and 8, one pulley and one belt for both spindles may be used, as shown in Figs. 9 and 10, the belt being crossed between the pulley and each spindle, as therein shown.

The above means of driving the spindles we believe to be new with us, but do not herein claim them, as they form part of another application for United States Letters Patent.

Having thus fully described our invention, we claim and desire to secure by Letters Patent of the United States—

1. In a spinning-machine, as a means of mounting a ring in the ring-rail, the ring-rail, rotatable bearings stationarily held on the ring-rail, the ring mounted on said bearings, and rotatable bearings above said ring stationarily held in operative contact therewith.

2. In a spinning-machine, as a means of mounting a ring in the ring-rail, the ring-rail, rotatable bearings stationarily held on the ring-rail, the ring mounted on said bearings, and rotatable bearings above said ring stationarily held in operative contact therewith, the said rotatable bearings being in vertical plane with each other.

3. In a spinning-machine, as a means of mounting a ring in the ring-rail, the ring-rail, rotatable bearings stationarily held on the ring-rail, the ring mounted on said bearings, rotatable bearings above said ring stationarily held in operative contact therewith, and one or more surfaces upon said ring in operative relation, combined with the rotatable bearings to restrict lateral movement of the ring while rotating.

4. In a spinning-machine, as a means of mounting a ring in the ring-rail, two sets of rotatable bearings stationarily held, and the ring having surfaces opposed to each other and to the two sets of rotatable bearings.

5. In a spinning-machine, as a means of mounting a ring in the ring-rail, rotatable bearings stationarily held on the ring-rail in opposed relation to each other, and the ring mounted between said bearings.

6. In a spinning-machine, as a means of mounting a ring in the ring-rail, the ring-rail, rotatable bearings stationarily held on the ring-rail in opposed relation to each other, and the ring mounted between said bearings, in line with annular grooves therein.

7. In a spinning-machine, as a means of mounting a ring in the ring-rail, the ring-rail, rotatable bearings stationarily held on the ring-rail, the ring mounted on said bearings, and rotatable bearings above said ring stationarily held and having operative contact with a horizontal and a vertical surface of said ring.

JOHN J. BUCKLEY.
THOMAS P. McGINN.
JOHN A. ROGAN.

In presence of—
F. F. RAYMOND, 2d,
M. V. FOLEY.